April 8, 1952     R. F. GARNER     2,591,803
THERMOSTATIC CONTROL SWITCH
Filed Feb. 15, 1950     3 Sheets-Sheet 1

INVENTOR.
RUSSELL F. GARNER
BY Albert J. Henderson
his
ATTORNEY

April 8, 1952

R. F. GARNER 2,591,803

THERMOSTATIC CONTROL SWITCH

Filed Feb. 15, 1950

INVENTOR.
RUSSELL F. GARNER.
BY
his ATTORNEY.

Patented Apr. 8, 1952

2,591,803

UNITED STATES PATENT OFFICE 2,591,803

THERMOSTATIC CONTROL SWITCH

Russell F. Garner, Youngwood, Pa., assignor to Robertshaw-Fulton Controls Company, Greensburg, Pa., a corporation of Delaware Application February 15, 1950, Serial No. 144,319

15 Claims. (Cl. 200—140)

This invention relates to thermostatic control switches and, more particularly, to control switches for electrically heated ovens provided with baking and broiling elements.

In ovens of this kind it is customary to provide a main switch controlled by a thermostat and separate control switches for the heating elements so that these can be individually controlled. An object of the present invention is to retain the operating features of prior controls while simplifying the construction by utilizing switch parts common to both heating elements. The preferred structure embodiment discloses a semifloating member which operates switch arms normally biased to a position for energizing one of the heating elements. When the switch arms are moved to another position, the one heating element is deenergized and the switch arms are positioned for energizing the other heating element. In both cases, the heating elements are under control of the main thermostatic switch to maintain a desired oven temperature for baking or broiling purposes.

Another object of the invention is to avoid meticulous adjustment of the operating parts, by yieldably mounting such parts for self-adjustment.

Another object of the invention is to facilitate assembly and disassembly of the control switch by housing the switch parts in a single casing having a removable cover for easy access to the interior.

Other objects and advantages will become apparent from the following description taken in connection with the accompanying drawings, wherein:

Fig. 5 is a schematic view showing the electrical connections, and Fig. 6 is a partial side elevation of a modification.

Figure 1:
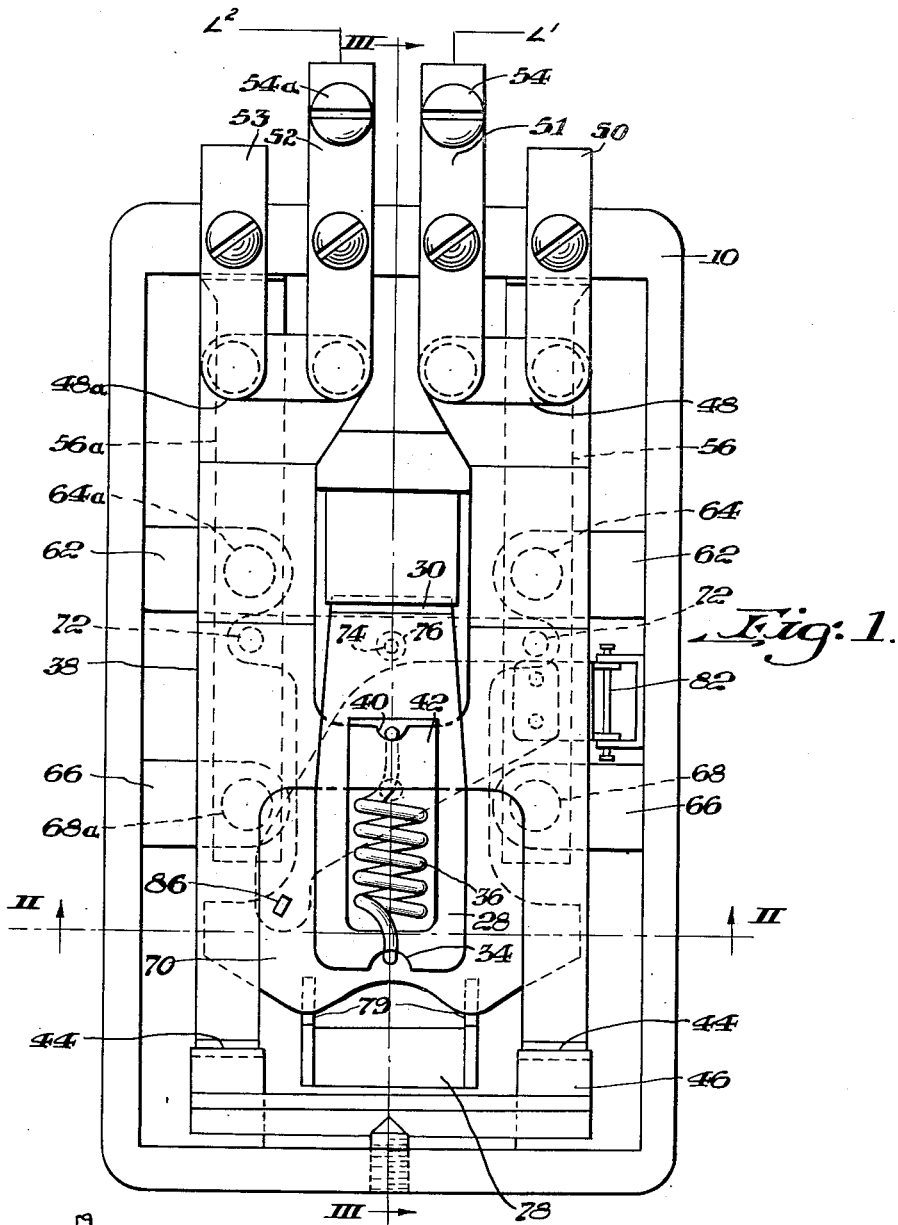
Fig. 1 is a front elevation of the control switch with the cover removed.
Figure 2:
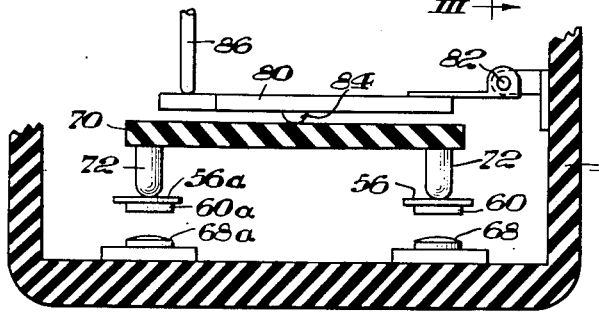
Fig. 2 is a cross section taken on the line II—II of Fig. 1.

Referring more particularly to the drawings, a cup-shaped casing 10 of insulating material is provided with a cover 12 for the open end thereof, carrying a centrally disposed bushing 14. An adjusting screw 16, preferably provided with left hand threads, is cooperable with the bushing 14 and carries on its exterior end the usual handle 18 by means of which the adjusting screw 16 can be rotated.

Temperature responsive means in the form of an expansible and contactable diaphragm element 20 is carried on the interior end of the adjusting screw 16 and has an operating button 22 projecting therefrom. The interior of the diaphragm 20 is in communication with a capillary tube 24 which extends exteriorly of the cover 12 for communication with the usual bulb element (not shown) to be located in the oven. As is well known, the temperature responsive means contains a liquid which expands upon the bulb being heated and serves to actuate the diaphragm 20 sufficiently to operate the parts now to be described.

The button 22 abuts a depression 26 formed in the face of a main actuating lever 28 of a snap-action means. The main actuating lever is provided at one end with a knife-edge 30 which is cooperable with a support 32 projecting from the casing 10. The opposite end of the lever is also provided with a knife-edge 34 around which one end of a coil spring 36 is hooked.

A main control lever 38 of generally H-shaped configuration is provided with a knife-edge 40 formed in the center bar 42 thereof, for receiving the opposite hooked end of the coil spring 36. The lower legs of the control lever 38 are each provided with a knife-edge 44 for cooperation with suitable bearings formed on an adjustable bridge element 46 supported in the casing 10. The upper legs of the control lever 38 are insulated from the lower legs and each carries a double-pole contact bridge 48, 48a for cooperation with pairs of fixed contacts 50, 51 and 52, 53 respectively, carried by the casing 10. The contacts 51 and 52 carry terminal connections 54, 54a for line wires L1, L2 respectively, as will be described more fully in connection with Fig. 5.

Figure 3:
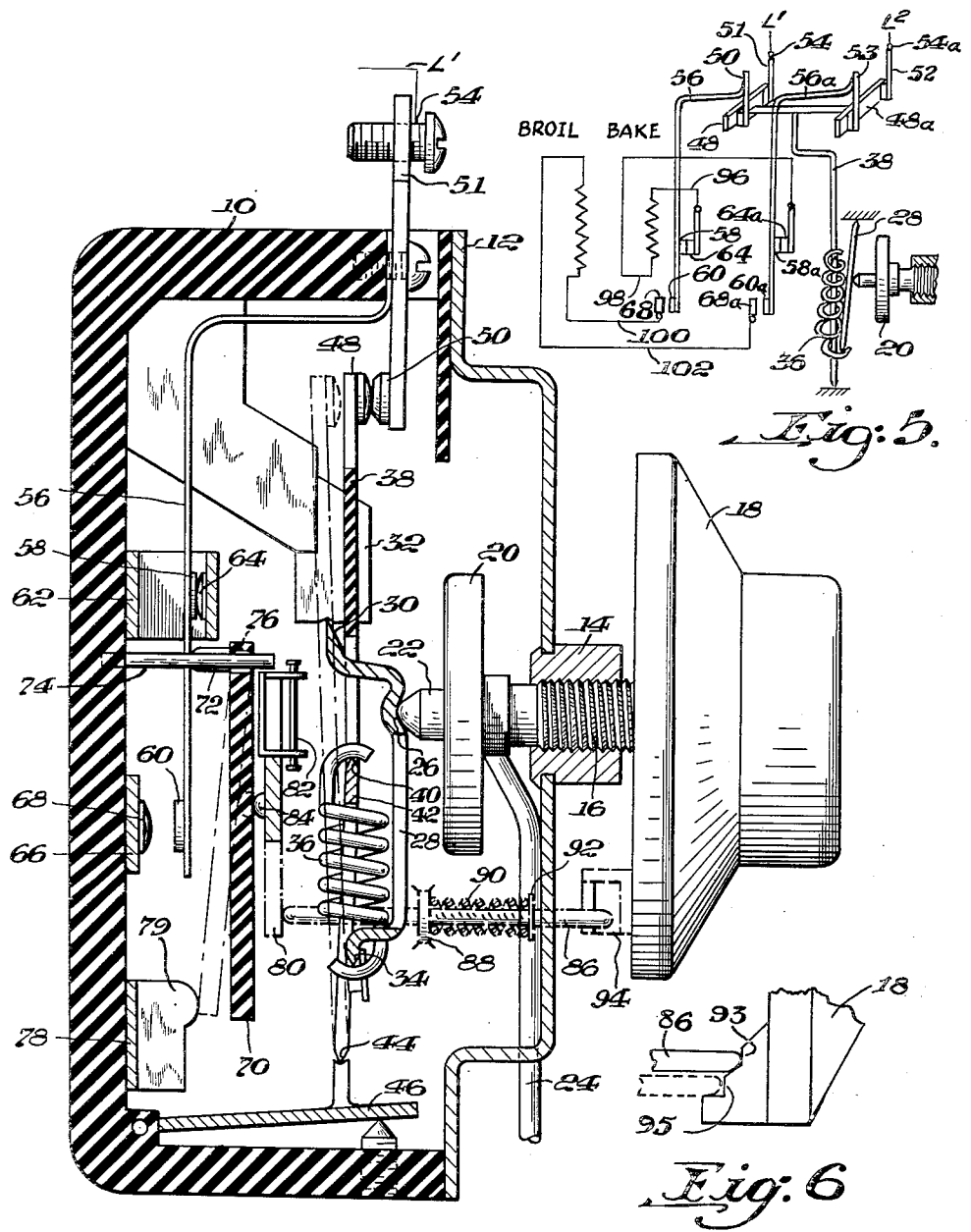
Fig. 3 is a longitudinal sectional view of the complete control switch taken on the line III—III on Fig. 1.

A pair of flexible switch arms 56, 56a is secured at one end to the contacts 50 and 53 respectively. The switch arms 56, 56a are formed of flexible material, of an electrical conducting nature and extend rearwardly into the casing 10, substantially parallel with the control lever 38 of the snap-action means. The switch arm 56 carries a pair of contacts 58, 60 disposed on opposite sides thereof and spaced longitudinally one from the other. Likewise, the switch arm 56a carries a pair of contacts 58a, 60a. A pair of supports 62 project from opposite sides of the casing 10 respectively and carry relatively stationary or fixed contacts 64, 64a for cooperation with the contacts 58, 58a on the switch arms 56, 56a respectively. A second pair of supports 66, project interiorly of the casing 10 and carry relatively stationary or fixed contacts 68, 68a for cooperation with the contacts 60, 60a on the switch arms 56, 56a respectively. The switch arm 56 has an inherent bias for closing the contacts 58, 64 and opening the contacts 60, 68 as shown in Fig. 3 of the drawings. The switch arm 56a is similarly biased relative to contacts 58a, 64a and 60a, 68a.

Means are provided for moving the flexible switch arms 56, 56a to open the contacts 58, 58a, 64, 64a and to close the contacts 60, 60a, 68, 68a. To this end, a toggle plate member 70 of insulating material is provided for movement toward and away from the flexible switch arms 56, 56a and has a pair of projections 72 thereon, which are operatively engageable with the switch arms 56, 56a, respectively. The plate member 70 is mounted in a semi-floating manner in the casing 10 by the provision of a support pin 74 which projects from the casing between the switch arms 56, 56a and through an aperture 76 formed in the end of the plate 70 having the projections 72 thereon. Sufficient clearance exists between the pin 74 and the aperture 76 to provide for free slidable movement of the plate 70 toward the switch arms 56, 56a. In its initial or unoperated position, the plate 70 may occupy the position shown in full lines in Fig. 3 of the drawings, but is adapted to be pivoted on the pin 74 in a clockwise direction to the broken-line position, also shown in Fig. 3 of the drawings. A stop 78 having a pair of spaced abutments 79 projects from the casing 10 into the path of movement of the plate 70 and serves to limit such movement to the broken-line position described. However, since the plate 70 is semi-floating it may initially occupy a position against the stop abutments 79. As will be apparent the plate 70 is held against sidewise tilting by the abutments 79 so that both switch arms 56, 56a are moved simultaneously by the projections 72.

Actuating means in the form of an operating lever 80 is provided for moving the plate 70 to its operative position. The lever 80 extends between the plate 70 and the snap-action means and is mounted at one end on a pivot 82 in the casing 10 on one side of the plate 70. Due to this arrangement, the lever 80 is movable in a path transverse to the path of movement of the plate 70. A projection 84 on the lever 80 engages with the plate 70 at the median portion thereof operating the same.

Manually operable means are provided for operating the lever 80 from the handle 18 and take the form of a plunger 86 which projects through the cover 12 and through a suitable bearing 88 carried thereon into operative engagement with the free end of the lever 80, remote from the pivot 82. A coil spring 90 is operative between the bearing 88 and an abutment 92 carried on the plunger 86 for returning the latter to its initial position following the manual operation. Convenient means for operating the plunger 86 at an appropriate angle of rotation of the handle 18, may be provided by a cam element 94 carried on the handle 18 for this purpose. It will be understood, however, that such connection between the handle 18 and the plunger 86 is not essential and the latter could be separately operated by a push button, if so desired. In the preferred embodiment shown and described herein, the cam element 94 is positioned on the handle 18 so that the plunger 86 will be operated whenever the handle 18 is rotated to the usual broil position. As shown in Fig. 6 the operation could be conducted in two steps by providing an element with two cam faces 93 and 95 respectively. Thus, when the cam face 93 is engaged with the plunger 86, the switch arms 56, 56a would be moved insufficiently to disengage contacts 58, 64, 58a, 64a but to engage contacts 60, 68, 60a, 68a. However, when the handle 18 is rotated to engage the cam face 95 with the plunger 86 then contacts 58, 64, 58a, 64a would become disengaged as in the previous embodiment. The operation of the alternative forms will be described in connection with the schematic embodiment shown in Fig. 5 of the drawings which follows immediately.

*Operation*

Referring more particularly to Fig. 5 of the drawings, the usual bake element is shown as being connected to the fixed contacts 64, 64a and the broil element to the fixed contacts 68, 68a. The dial or handle 18 being in the "off" position, the button 22 will have caused the snap-action mechanism to hold the control lever 38 in the broken-line position shown in Fig. 3 of the drawings with the contact bridges 48, 48a in open position. When the handle 18 is rotated clockwise to any temperature setting, except broil, then the adjusting screw 16 and the diaphragm 20 will move away from the main actuating lever 28 of the snap-action means, allowing the control lever 38 to snap to the full line position shown in Fig. 3. In such position, the contact bridges 48, 48a are closed. As the contacts 58, 64, 58a, 64a controlling the bake element are initially closed due to the inherent bias of the flexible switch arms 56, 56a, then current will flow to the bake element by way of line wire L1, terminal 54, fixed contact 51, contact bridge 48, fixed contact 60, switch arm 56, contacts 58, 64, wire 96, bake element, wire 98, contacts 58a, 64a, switch arm 56a, fixed contact 53, contact bridge 48a, fixed contact 52 and terminal 54a to line wire L2.

When the diaphragm 20 expands at the predetermined temperature set by the handle 18, it will force the main actuating lever 28 away from the adjusting screw 16, causing the control lever 38 to snap to the broken-line position shown in Fig. 3. Consequently, the circuit previously traced is broken by the main control switch and will remain broken until the diaphragm 20 again contracts to allow the main actuating lever 28 to move toward the adjusting screw 16 and repeat the operation.

When the handle 18 is rotated clockwise to the broil position, then the adjusting screw 16 and diaphragm 20 will be moved away from the main actuating lever 28 of the snap-action mechanism, thus allowing the main control lever 38 to move to its full line position as shown in Fig. 3. At the same time, the cam element 94 will engage the plunger 86 and move it inwardly of the casing 10 into operative engagement with the lever 80. The lever 80 is thus rotated on its pivot 82 toward the plate 70 which immediately starts to pivot in a clockwise direction, as viewed in Fig. 3 to the broken-line position there shown unless it is already in such position as previously explained. The end of the plate 70 will then pivot in the opposite or counterclockwise direction about the stop 78 as a fulcrum. The projections 72 on the plate 70 now move the switch arms 56, 56a against their inherent bias away from the support 62 thus opening the contacts 58, 64, 58a, 64a controlling the bake element. Preferably, the switch arms 56, 56a are thereafter moved sufficiently far to close the contacts 60, 68, 60a, 68a controlling the broil element although such movement could occur prior to or simultaneously with the opening of the bake contacts as hereinafter explained.

The circuit for the broil element may be traced on Fig. 5 as follows, line wire L1, terminal 54, fixed contact 51, contact bridge 48, fixed contact 50, switch arm 56, contacts 60, 68, wire 100, broil element, wire 102, contacts 68a, 60a, switch arm 56a, fixed contact 53, contact bridge 48a, fixed contact 52 and terminal 54a to line wire L2. The broil element will remain energized as long as the handle 18 remains in the broil position, unless the diaphragm 20 expands sufficiently to open the contact bridges 48, 48a as previously described. Upon return of the handle 18 to the "off" position, the adjusting screw 16 and diaphragm 20 will be moved sufficiently far to the left, as viewed in Fig. 3 of the drawings, to actuate the snap-action mechanism and cause the main control lever 38 thereof to assume the broken-line position. Thus, the contact bridges 48, 48a will be open and no current will flow to either the bake or broil elements, even though the bake contacts 58, 64 and 58a, 64a are now closed due to the inherent bias of the switch arms 56, 56a. In the operation of the embodiment shown in Fig. 6, the movement of the handle 18 may place the plunger 86 in engagement with the cam face 93 as shown in full lines. A preheat operation will then be conducted since both the broil and bake elements will be energized. A further operation of the handle 18 to place the plunger 86 in engagement with the other cam face 95 as shown in broken-lines will effect the described broil operation. It will be apparent that the location of the projections 72 longitudinally of the switch arms 56, 56a will govern the adjustment required to open the bake contacts either before or after the broil contacts are closed. Hence, the two-face cam arrangement of Fig. 6 is feasible as a modified form of that shown in Figs. 1-4 where a preheat operation is desired.

Figure 4:
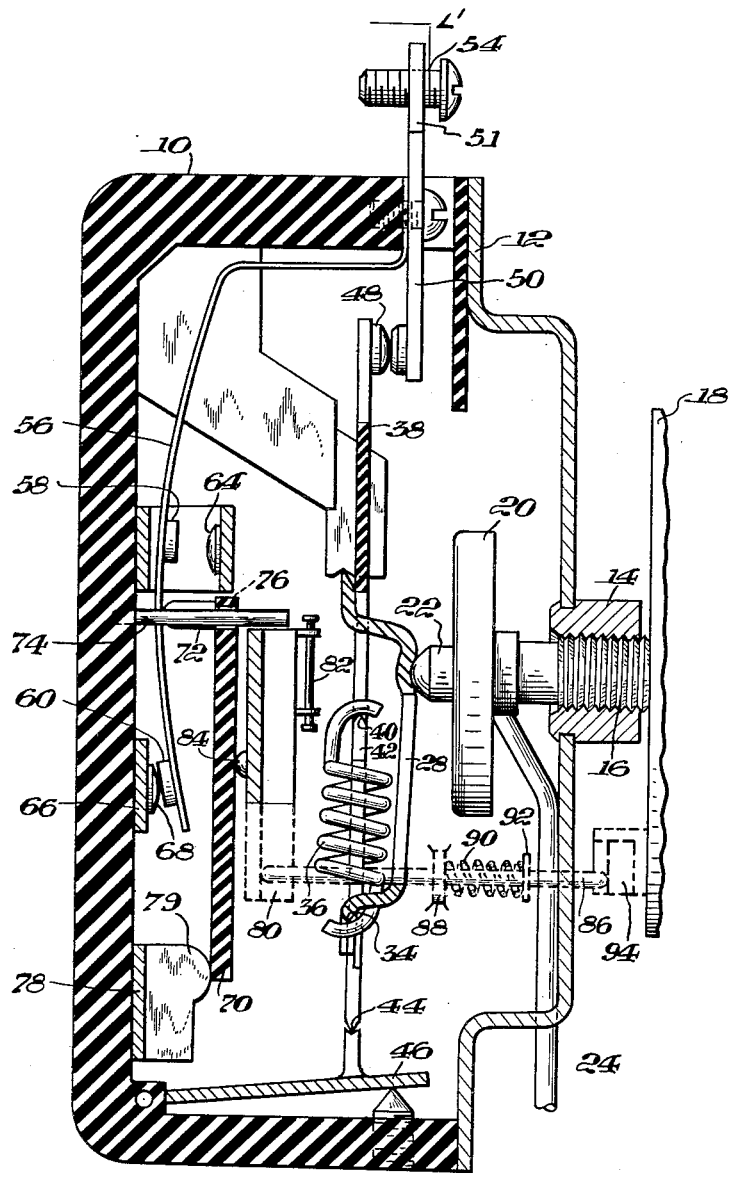
Fig. 4 is a longitudinal sectional view corresponding to Fig. 3 but showing the parts in another position of operation.

As clearly shown in Fig. 4 of the drawings, the flexible switch arms 56, 56a may be bowed against their inherent bias upon further movement of the plate 70, after the broil switch contacts 60, 68, 60a, 68a are engaged. Consequently, no damage to the operating parts will occur should such overtravel take place due to lack of adjustment either upon initial assembly or later damage. The circuit to both sides of the line L1, L2 is broken at appropriate times substantially simultaneously due to the spaced abutments 79 insuring that both of the projections 72 will be in engagement with the switch arms 56, 56a and that no sidewise tilting of the plate 70 will occur. While a pair of flexible switch arms 56, 56a have been disclosed in this preferred embodiment it will be apparent that a similar effect could be obtained by relatively rigid switch arms and yieldably mounted contacts on the broil and bake switches. Such modifications together with other modifications and changes in the details of construction and arrangement of parts may be made within the scope of the appended claims.

I claim:

1. A thermostatic control device comprising a main switch, temperature responsive means for operating said main switch, a pair of relatively stationary contacts adapted for connection to said main switch and being spaced one from the other, a movable switch arm extending from said main switch for alternatively closing said contacts and being biased toward one of said contacts, a movable member operatively engageable at one end with said switch arm, a support on which said member is mounted at said one end for slidable movement toward said switch arm, a stop for the opposite end of said member, and means operatively engageable with said member at the median portion thereof for holding said opposite end of said member against said stop and thereafter moving said member on said support against the bias of said switch arm for closing said other contact.

2. A thermostatic control device comprising a main switch, temperature responsive means for operating said main switch, a pair of relatively stationary contacts adapted for connection to said main switch and being spaced one from the other, a movable switch arm extending from said main switch for alternatively closing said contacts and being biased toward one of said contacts, a movable member supported for operative engagement at one end with said switch arm, a stop for the opposite end of said member, and means for moving said member to operate said switch arm, said movement being pivotal in one direction for holding said opposite end in engagement with said stop and thereafter being pivotal in an opposite direction for overcoming said bias and causing operation of said switch arm toward the other said contact.

3. A thermostatic control device as claimed in claim 2 wherein said movable member is free to move at said one end relatively to said switch arm and is initially subject to said bias, said opposite end of said member being free to move relatively to said stop.

4. A thermostatic control device as claimed in claim 2 wherein said movable member operatively engages said switch arm closely adjacent said one contact for opening the one prior to closing the other.

5. A thermostatic control device comprising a main switch, temperature responsive means for operating said main switch, a pair of relatively stationary contacts adapted for connection to said main switch and being disposed rearwardly at different distances from said main switch and spaced longitudinally from each other, a movable switch arm extending from said main switch between said contacts for alternative engagement on opposite sides thereof with one or the other of said contacts, said switch arm being initially biased toward one of said contacts and spaced from the other, a toggle plate operatively engageable at one end with said switch arm, a support upon which said plate is mounted at said one end for slidable movement toward said switch arm, a stop for the opposite end of said plate, actuating means operatively engageable with said plate at the median portion thereof for moving the same to operate said switch arm, said movement being pivotal in one direction for holding said opposite end in engagement with said stop and thereafter being pivotal in an opposite direction for overcoming said bias and causing operation of said switch arm toward the other said contact, a handle for adjusting said temperature responsive means, and connecting means between said handle and said actuating means operative in one position of said handle for initiating said pivotal movement of said switch arm.

6. A thermostatic control device comprising a main switch, temperature responsive means for operating said main switch, a pair of relatively stationary contacts adapted for connection to said main switch and being spaced one from the other, a flexible switch arm secured to said main switch and extending between said contacts, said switch arm having an inherent bias into operative engagement with one of said contacts, a toggle plate operatively engageable with said switch arm intermediate said contacts, means for supporting said plate adjacent one end thereof for slidable movement toward said switch arm, means operatively engageable with said plate at the median portion thereof for imparting said movement, and a stop for the opposite end of said plate causing pivotal movement of said one end thereof to overcome said bias and engage said switch arm with the other said contact, said switch arm being bowed against its inherent bias upon further movement of said plate after said engagement with said other contact.

7. A thermostatic control device comprising a main switch, temperature responsive means for operating said main switch, a pair of relatively stationary contacts adapted for connection to said main switch and being disposed rearwardly at different distances from said main switch and spaced longitudinally from each other, a flexible switch arm secured at one end to said main switch and having a free end extending between said contacts for alternative engagement of opposite sides thereof with one or the other of said contacts, said switch arm having an inherent bias into operative engagement with one of said contacts and being spaced from the other, a toggle plate operatively engageable at one end with said switch arm, a support upon which said plate is mounted at said one end for slidable movement toward said switch arm, a stop for the opposite end of said plate, actuating means operatively engageable with said plate at the median portion thereof for moving the same to operate said switch arm, said movement being pivotal in one direction for holding said opposite end in engagement with said stop and thereafter being pivotal in an opposite direction for overcoming said bias and causing operation of said switch arm into operative engagement with the other said contact, said switch arm being bowed against its inherent bias upon further movement of said plate after said engagement with said other contact, a handle for adjusting said temperature responsive means, and connecting means between said handle and said actuating means operative in one position of said handle for initiating said pivotal movement of said switch arm.

8. A thermostatic control device comprising a main switch, temperature responsive means for operating said main switch, a pair of relatively stationary contacts adapted for connection to said main switch and being spaced laterally one from the other, a pair of flexible switch arms extending from said main switch and being biased for closing said pair of contacts respectively, a movable member operatively engageable at one end with said pair of switch arms, a support upon which said member is mounted at said one end for slidable movement toward said switch arms, a stop having laterally spaced abutments thereon engageable with the opposite end of said member, and means operatively engageable with said member intermediate said ends thereof for positioning said opposite end of said member against said abutments and thereafter moving said member on said support for overcoming the bias of said switch arms and opening said pair of contacts substantially simultaneously.

9. A thermostatic control device comprising a casing having a plurality of fixed contacts mounted thereon, a double-pole contact bridge assembly cooperable with said fixed contacts to form a main control switch, snap-action means operatively associated with said main control switch, temperature responsive means for operating said snap-action means, a pair of flexible switch arms each secured at one end to one of said contact bridges and extending rearwardly into said casing, a second plurality of fixed contacts mounted in said casing, said second fixed contacts being disposed one pair to each of said switch arms on opposite sides thereof and spaced longitudinally from each other, said switch arms each having an inherent bias for closing one of said contacts of each pair of said second fixed contacts and being spaced from the other one of said pair for opening the same, a toggle plate member operatively engageable at one end with said pair of switch arms, a support extending from said casing between said switch arms and upon which said member is mounted at said one end for slidable movement toward said switch arms, a stop mounted in said casing for cooperation with the opposite end of the member, actuating means operatively engageable with said member at the median portion thereof for moving the same to operate said switch arms against said bias for closing the other contacts of said pair of second fixed contacts, a handle for adjusting said temperature responsive means, and connecting means between said handle and said actuating means operative in one position of said handle for initiating said movement of said switch arms.

10. A thermostatic control device as claimed in claim 9 wherein said actuating means comprises an operating lever pivotally mounted in said casing on one side of the toggle plate member and being movable in a path transverse to the path of movement of said member.

11. A thermostatic control device as claimed in claim 9 wherein said toggle plate member operatively engages said pair of switch arms closely adjacent said one contact of said pair of second fixed contacts and relatively remote from said other contacts of said pair of second fixed contacts for opening the one prior to closing the other.

12. A thermostatic control device comprising a main switch, temperature responsive means for operating said main switch, a pair of relatively stationary contacts adapted for connection to said main switch and being spaced one from the other, a movable switch arm extending from said main switch being biased toward one of said contacts, a movable member supported for operative engagement at one end with said switch arm, a stop for the opposite end of said member, actuating means for moving said member to operate said switch arm toward the other said contact, a handle for adjusting said temperature responsive means, a cam element having a double cam surface carried by said handle, and connecting means between said cam element and said actuating means operative in one position of said handle for closing said other contact and in another position for opening said one contact.

13. A thermostatic control device comprising a main switch, temperature responsive means for operating said main switch, a relatively stationary contact adapted for connection to said main switch, a flexible switch arm extending from said main switch and being biased into engagement with said contact, a movable member operatively engageable at one end with said switch arm, a support upon which said member is mounted at said one end for slidable movement toward said switch arm, a stop engageable with the opposite end of said member, and means operatively engageable with said member intermediate said ends thereof for positioning said opposite end of said member against said stop and thereafter moving said member on said support for overcoming the bias of said switch arm and moving said switch arm out of engagement with said contact.

14. A switch device comprising a relatively stationary contact, a switch arm biased into engagement with said contact, a movable member operatively engageable at one end with said switch arm, a support upon which said member is mounted at said one end for slidable movement toward said switch arm, a stop engageable with the opposite end of said member, and means operatively engageable with said member intermediate said ends thereof for positioning said opposite end of said member against said stop and thereafter moving said member on said support for overcoming the bias of said switch arm and moving said switch arm out of engagement with said contact.

15. A switch device comprising a pair of relatively stationary contacts spaced one from the other, a switch arm adapted for alternatively engaging said contacts and being biased toward one of said contacts, a movable member operatively engageable at one end with said switch arm, a support upon which said member is mounted at said one end for slidable movement toward said switch arm, a stop for the opposite end of said member, and means operatively engageable with said member at the medial portion thereof for moving said opposite end of said member against said stop and thereafter moving said member on said support against the bias of said switch arm for closing said other contact.

RUSSELL F. GARNER.

REFERENCES CITED

The following references are of record in the file of this patent:

UNITED STATES PATENTS

| Number | Name | Date |
|---|---|---|
| 2,441,192 | Graves | May 11, 1948 |